United States Patent [19]

Ishii et al.

[11] Patent Number: 5,047,936
[45] Date of Patent: Sep. 10, 1991

[54] GEAR SHIFT CONTROL FOR POWER TRAIN

[75] Inventors: Shigeru Ishii, Atsugi; Shigeki Shimanaka, Hadano, both of Japan

[73] Assignee: Nissan Motor Co., Ltd., Yokohama, Japan

[21] Appl. No.: 385,867

[22] Filed: Jul. 27, 1989

[30] Foreign Application Priority Data

Jul. 28, 1988 [JP] Japan ................................ 63-186978

[51] Int. Cl.$^5$ ............................................ B60K 41/10
[52] U.S. Cl. .................................. 364/424.1; 74/858; 74/866
[58] Field of Search ............... 364/424.1; 74/858, 866, 74/867

[56] References Cited

U.S. PATENT DOCUMENTS

| | | | |
|---|---|---|---|
| 4,283,970 | 8/1981 | Vukovich | 74/866 |
| 4,370,903 | 2/1983 | Stroh et al. | 74/858 |
| 4,680,992 | 7/1987 | Hayasaki et al. | 74/869 |
| 4,742,461 | 5/1988 | Eschrich et al. | 364/424.1 |
| 4,744,031 | 5/1988 | Takeda et al. | 364/424.1 |
| 4,783,743 | 11/1988 | Yashiki et al. | 364/424.1 |
| 4,815,340 | 3/1989 | Iwatsuki et al. | 74/858 |
| 4,868,753 | 9/1989 | Mori | 364/424.1 |
| 4,870,581 | 9/1989 | Ito et al. | 364/424.1 |
| 4,933,851 | 6/1990 | Ito et al. | 364/424.1 |

FOREIGN PATENT DOCUMENTS

| | | |
|---|---|---|
| 0228899 | 7/1987 | European Pat. Off. . |
| 58-77138 | 5/1983 | Japan . |
| 61-105235 | 5/1986 | Japan . |
| 2051979 | 1/1981 | United Kingdom . |
| 2057603 | 1/1981 | United Kingdom . |

OTHER PUBLICATIONS

"Nissan Full-Range Automatic Transmission RE4R-01A Type, Service Manual", Mar. 1987.

Primary Examiner—Salvatore Cangialosi
Attorney, Agent, or Firm—Foley & Lardner

[57] ABSTRACT

A period time required for a gear shift operation is measured from the time at which a prime motor output speed starts decreasing to the time at which a psuedo speed ratio reaches a predetermined value. Based on the period of time measured, a line pressure is controlled during the period of time. Alternatively, a prime motor output torque is controlled during the period of time measured.

4 Claims, 4 Drawing Sheets

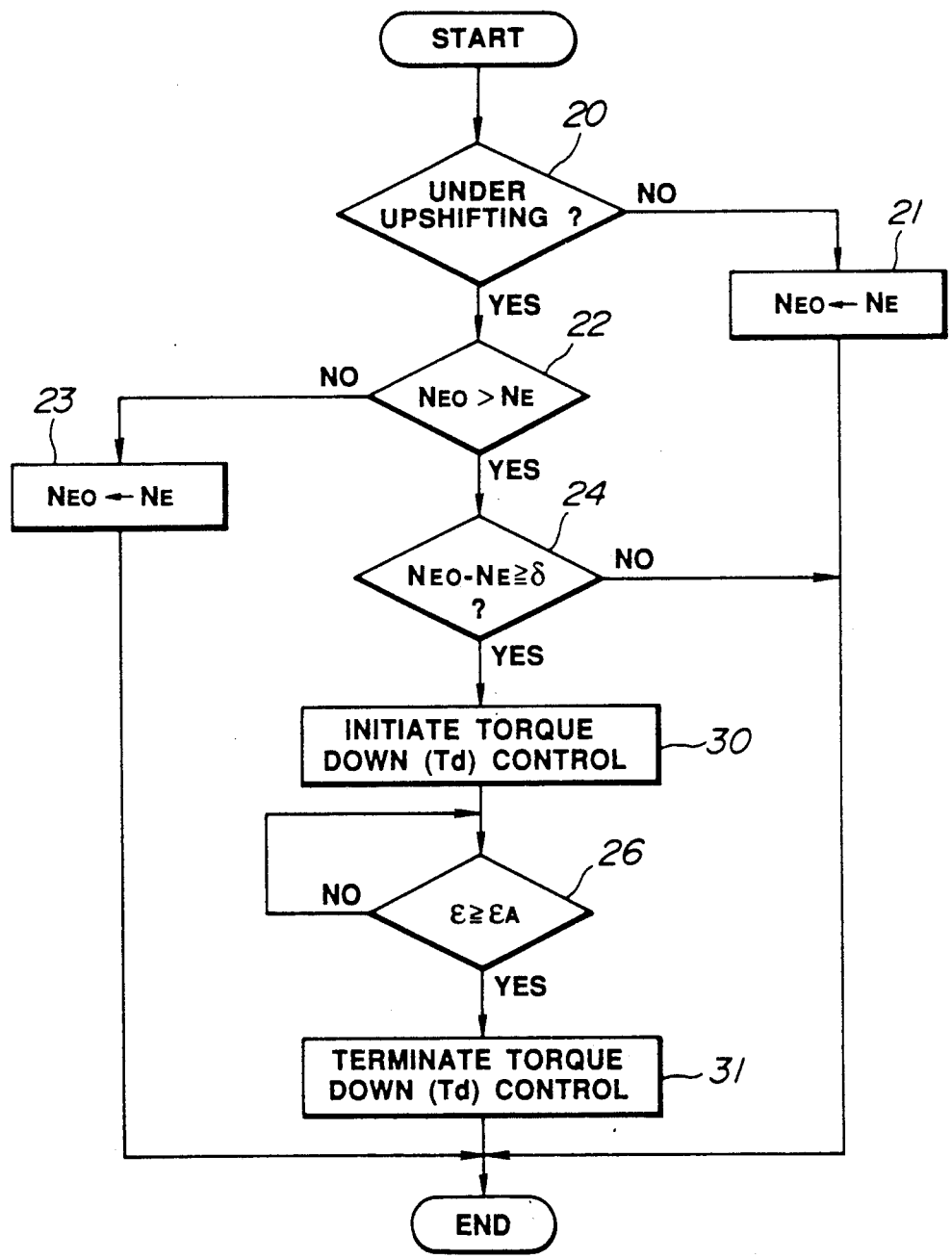

GEAR SHIFT CONTROL FOR POWER TRAIN

BACKGROUND OF THE INVENTION

This invention relates to a gear shift control for a power train including a prime motor and an automatic transmission to reduce shocks in a gear shift operation of the automatic transmission.

Automatic transmissions, which employ a line pressure to selectively operate various friction elements (clutches, brakes and the like) in selecting a desired gear ratio, can change the gear ratio to another gear ratio.

However, shocks will occur during the gear shift operation. An attempt has been made in Japanese Patent Kokai No. 58-77138 to change the prime motor output torque during the gear shift operation.

It has been proposed, in U.S. patent application Ser. No. 07/289,050, filed on Dec. 23, 1988 now U.S. Pat. No. 4,981,053 (corresponding to European Patent Application No.: 88 121 587.5, filed on Dec. 23, 1988) to control the torque capacity of the shifting friction element operable on a line pressure during a gear shift operation by controlling the line pressure based on learned data in such a manner as to adjust the gear shift time (viz., a period of time for the inertia phase) to a target value.

It is necessary for such shock reducing apparatus to detect the fact that the automatic transmission is in the course of a gear shift operation. With the former apparatus adapted to control the prime motor output torque, the fact that the automatic transmission is in the course of a gear shift operation is detected by comparing the estimated degree of change of the prime motor output speed during the gear shift operation with the detected prime motor output speed. With the latter apparatus adapted to control the line pressure, the fact that the automatic transmission is in the course of a gear shift operation is detected based on changes in the apparent gear ratio of the detected input and output speeds of the automatic transmission.

With the former apparatus, however, shocks cannot be reduced to a sufficient extent during the gear shift operation since an accurate detection of the time at which the gear shift operation is completed is not expected. This stems from the fact that the degree of change of the vehicle speed changes during the gear shift operation so that the actual degree of change of the prime motor output speed differs from the estimated value. With the latter apparatus, it is possible to exactly detect the gear shift operation regardless of vehicle speed changes. However, it requires an expensive speed sensor, resulting in an expensive and complex detecting and controlling arrangement.

An object of the present invention is to improve a gear shift shock control such that the beginning of a gear shift operation and the termination thereof are detected without the use of any additional speed sensor so as to provide settings for reducing shocks during the gear shift operation.

SUMMARY OF THE INVENTION

According to the present invention, there is provided a gear shift control apparatus for a power train including a prime motor, a torque converter, and an automatic transmission to which a prime motor output torque is transmitted through the torque converter, the automatic transmission being subjected to a gear shift operation from a gear position with a first gear ratio to another gear position with a second gear ratio, the gear shift control comprising:

prime motor speed sensor means for detecting the output speed of the prime motor and generating a prime motor speed indicative signal indicative of said prime motor speed detected;

transmission output speed sensor means for detecting the output speed of the automatic transmission and generating a transmission output speed indicative signal indicative of said transmission output speed detected;

torque converter pseudo speed ratio calculating means for multiplying said automatic transmission output speed indicative signal by the gear ratio of another gear position after the gear shift operation to give a psuedo input speed, and for calculating a ratio of said pseudo input speed to said prime motor output speed detected to give a torque converter pseudo speed ratio and generating said torque converter pseudo speed ratio indicative signal indicative of said torque converter psuedo speed ratio given; and means for measuring a period of time for the gear shift operation from the time at which said prime motor output speed signal indicative signal starts decreasing to the time at which said torque converter pseudo speed ratio reaches a predetermined value.

According to further aspect of the present invention, there is also provided means for controlling a line pressure which a friction element involved in the gear shift operation is activated during said period of time measured.

According to another aspect of the present invention, there is provided a gear shift control method for a power train including a prime motor, a torque converter, and an automatic transmission to which a prime motor output torque is transmitted through the torque converter, the automatic transmission being subjected to a gear shift operation from a gear position with a first gear ratio to another gear position with a second gear ratio, the gear shift control method comprising the steps of:

detecting the output speed of the prime motor and generating a prime motor speed indicative signal indicative of said prime motor speed detected;

detecting the output speed of the automatic transmission and generating a transmission output speed indicative signal indicative of said transmission output speed detected;

calculating means for multiplying said automatic transmission output speed indicative signal by the gear ratio of another gear position after the gear shift operation to give a psuedo input speed;

calculating a ratio of said pseudo input speed to said prime motor output speed detected to give a torque converter pseudo speed ratio and generating said torque converter pseudo speed ratio indicative signal indicative of said torque converter psuedo speed ratio given; and measuring a period of time for the gear shift operation from the time at which said prime motor output speed signal indicative signal starts decreasing to the time at which said torque converter pseudo speed ratio reaches a predetermined value.

The automatic transmission employs a line pressure to selectively operate at least one friction element in selecting a desired gear ratio and it transmits a drive fed thereto through the torque converter from the prime motor at the selected gear ratio. Furthermore, the automatic transmission can change the friction element to change the gear ratio to another gear ratio. The gear shift operation detecting means detects the fact that the automatic transmission is in the course of the gear shift operation. The line pressure control means can control the torque capacity of the friction elements operated on the line pressure to reduce shocks during the gear shift operation.

During the gear shift operation, the pseudo speed ratio calculating means obtains a pseudo input speed by multiplying the detected automatic transmission output speed by a gear ratio after the gear shift operation. The pseudo speed ratio calculating means obtains a torque converter pseudo speed ratio represented by a ratio of the pseudo input speed to the detected prime motor output speed.

The gear shift operation detecting means detects the initiation of the gear shift operation when the output speed detected by the prime motor speed sensor starts decreasing and the termination of the gear shift operation when the torque converter pseudo speed ratio calculated by the pseudo speed ratio calculating means reaches a predetermined value. Therefore, the gear shift operation detecting means detects the fact that the automatic transmission is in the course of the gear shift operation all during the time period between the time at which the detected prime motor output speed starts decreasing and the time at which the pseudo speed ratio reaches a predetermined value.

When, during a gear shift operation, the vehicle speed is subject to a change, the automatic transmission output speed changes. Thus, upon completion of the gear shift operation, the prime motor output speed also changes. However, the pseudo speed ratio, i.e., a ratio of the product of the automatic transmission output speed and a gear ratio that is established upon completion of the gear shift operation to the prime motor output speed, remains unchanged upon completion of the gear shift operation and thus is independent of the change of the vehicle speed. During the gear shift operation, this ratio varies with variation in a ratio of the prime motor output speed to the transmission output speed.

According to the invention, therefore, no additional speed sensor is required except for an automatic transmission output speed sensor normally used to detect the vehicle speed and a prime motor output speed sensor normally used to control the spark and fuel-injection timing of the prime motor. This results in an inexpensive and simple apparatus which can control the line preessure to reduce shocks to a sufficient extent during the gear shift operation.

The torque control means can control the prime motor output torque based on the detection results of the gear shift operation detecting means to reduce shocks during a gear shift operation. The gear shift operation detecting means employs the torque converter pseudo speed ratio calculated by the pseudo speed ratio calculating means based on the prime motor output speed and the automatic transmission output speed to detect the fact that the automatic transmission is in the course of a gear shift operation.

According to the invention, there is provided an inexpensive and simple apparatus which can exactly detect the fact that the automatic operation and reduce shocks to a sufficient extent during the gear shift operaiton without the use of any additional speed sensor.

BRIEF DESCRIPTION OF THE DRAWINGS

FIG. 4 is a flow diagram, like FIG. 2, showing another embodiment of the invention.

DETAILED DESCRIPTION OF THE INVENTION

Description will be made to several embodiments of the invention with reference to the accompanying drawings.

Figure 1:
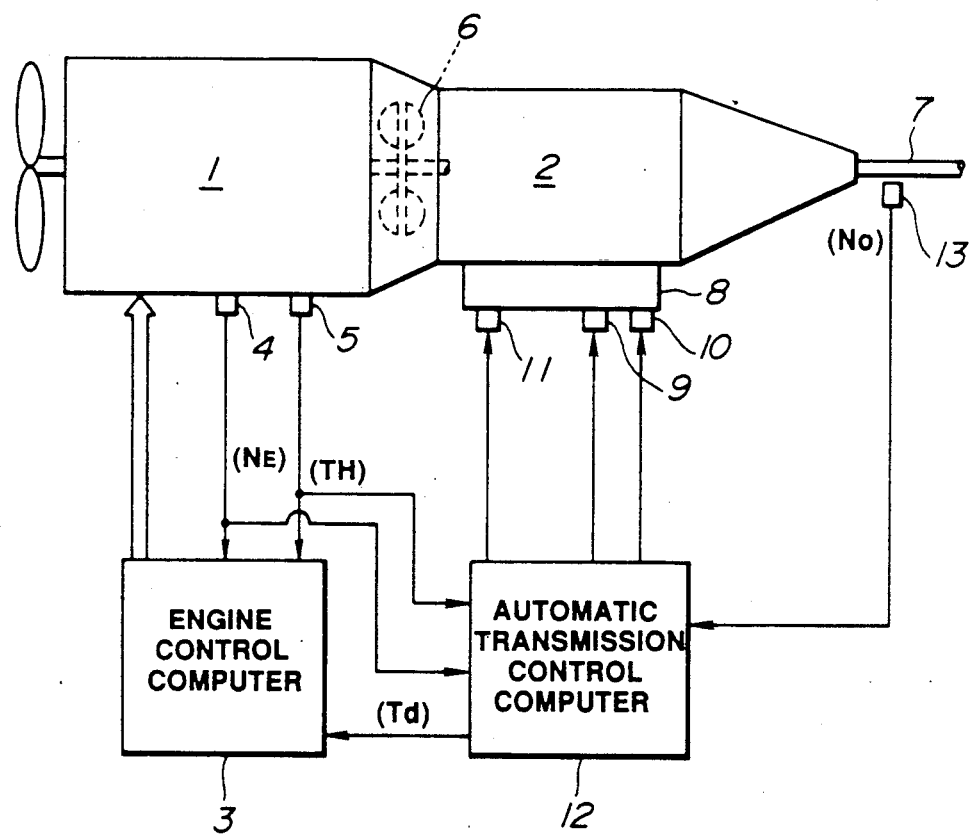
FIG. 1 is a schematic view showing one embodiment of the invention.

In FIG. 1, which shows one embodiment of the invention, the numeral 1 designates an engine and 2 an automatic transmission. The operation of the engine 1 is controlled by an engine control computer 3 which calculates appropriate values for ignition-system spark-timing and fuel-injection pulse-width. For this purpose, the computer 3 receives a signal from a sensor 4 provided to detect the engine speed NE, and a signal from a sensor 5 provided to detect the engine throttle position TH.

The drive comes from the engine 1 through a torque converter 6 to the automatic transmission 2 which in turn transmits a torque to an output shaft 7 so as to drive the motor vehicle. In order to control the automatic transmission, a control valve 8 is provided. The control valve includes first and second shift solenoids 9 and 10, and a line pressure solenoid 11. These solenoids 9-11 are controlled by an automatic transmission control computer 12. The automatic transmission control computer operates the friction elements (not shown) of the automatic transmission 2 to make a gear ratio selection based on the vehicle speed and throttle position by selectively switching ON and OFF the solenoids 9 and 10 for selective application of a line pressure to the friction elements, as shown in the following table.

TABLE 1

| Gear Position | First shift Solenoid 9 | Second Shift Solenoid 10 |
|---|---|---|
| 1st gear | ON | ON |
| 2nd gear | OFF | ON |
| 3rd gear | OFF | OFF |
| 4th gear | ON | OFF |

The line pressure is controlled by controlling the duty ratio of a drive signal supplied to the solenoid 11 according to the selected gear and the throttle position.

In order to perform the gear shift control and the line pressure control, the computer 12 receives signals indicative of the engine speed NE and throttle position TH from the sensors 4 and 5 and also a signal indicative of the speed No (engine speed) of the output shaft 7. In addition to the gear shift control and the line pressure control, the computer 12 has another function of producing a torque down signal Td to the engine control computer 3. The computer 3 responds to the torque down signal by reducing the number of the cylinders of the engine 1 having a supply of fuel so as to reduce the engine output torque. This is effective to reduce shocks during the gear shift operation.

Figure 2:
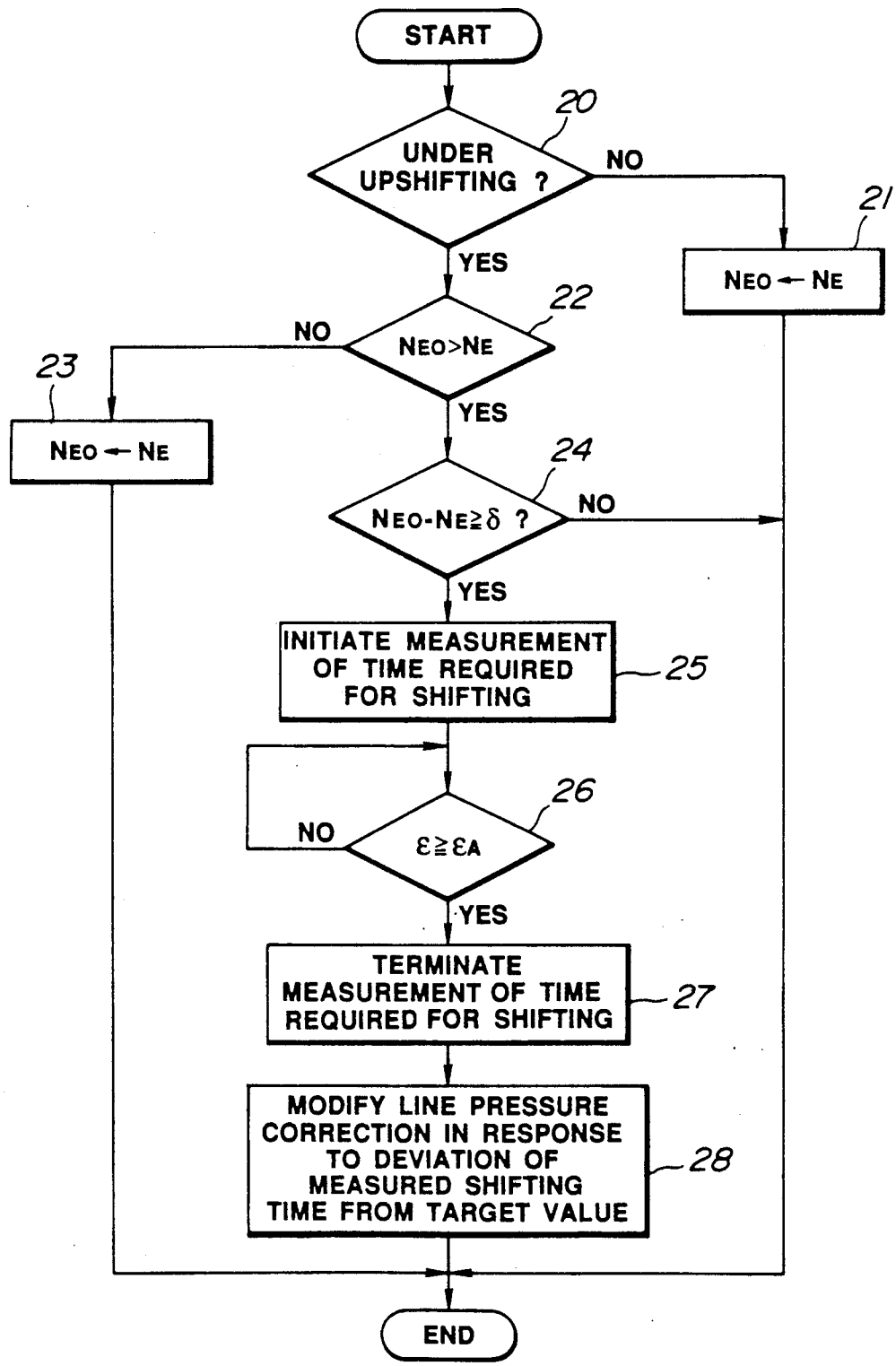
FIG. 2 is a flow diagram illustrating the programing of the automatic transmission control computer as it is used to modify the line pressure correction factor.

FIG. 2 shows a program used in the computer 12 to determine a line pressure correction factor from learned data. For an easy understanding, description will be limited to controls based on the line pressure data learned during upshift operations where the engine speed NE decreases. At the step 20, a determination is made as to whether or not the performed operation is an upshift operation; that is, whether or not an upshift operation is being performed. If the performed operation is not an upshift operation, then no control is made based on learned line pressure data and the program proceeds to the step 21 where the existing engine speed value NE is read into the computer memory to update the engine speed value NEO just before the gear shift operation starts. The updated engine speed value NEO is used in determining the start of the gear shift operation.

If the gear shift operation is an upshift operation, then the program proceeds to the steps 22 to 28 where the line pressure correction factor is modified (or updated) based on the learned data in the following manner: At the steps 22 and 23, the engine speed value NEO just before the gear shift operation starts is updated respectively until the read engine speed value NE changes in an unchanged or decreasing direction from an increasing direction. As a result, the engine speed value NEO just before the gear shift operation starts is greater than the engine speed values read after the gear shift operation is decided. If the read engine speed value NE starts decreasing, then the program proceeds to the determination step 24. This determination is as to whether or not an upshift operation is started. The answer to this question is "yes" when the stored engine speed value NEO minus the existing engine speed value NE is equal to or greater than a predetermined value $\delta$. The reason for this is as follows: Even if the combination of the ON and OFF positions of the solenoids 9 and 10 is changed at time T1 when an upshift operation is decided, as shown by the solid line of FIG. 3, the engaged or disengaged conditions of the friction elements cannot be changed immediately because of the delayed operation caused by the hydraulic circuit. When the changes of the engaged or disengaged conditions of the friction elements are completed, the engine speed NE starts changing in the decreasing direction. It is, therefore, possible to determine the fact that the gear shift operation starts at time T2 by confirming this change in the decreasing direction from such a decrease by the predetermined value $\delta$ or more. If the gear shift operation is not started, then the control is terminated without updating the line pressure correction factor. If the gear shift operation starts, then the program proceeds to the step 25 where a gear shift time measuring timer is actuated to start the measurement of the time period of the gear shift operation. At the step 26, the transmission output speed NO is multiplied by a gear ratio iA that is established after the gear shift operation to obtain a pseudo transmission input speed NO×iA. A pseudo speed ratio $\epsilon$, which is a ratio of the pseudo transmission input speed to the engine speed NE, is calculated as $\epsilon=(NO\times iA)/NE$. The pseudo speed ratio is compared with a predetermined pseudo speed ratio value $\epsilon A$. Since the pseudo speed ratio $\epsilon$ is constant for each of the gear ratios, the predetermined pseudo speed ratio value $\epsilon A$, which is set for one gear ratio, is less by a predetermined value than the pseudo speed ratio $\epsilon$, for the gear ratio. The predetermined pseudo speed ratio value may be variable. The setting may be such that the predetermined pseudo speed ratio value is variable for each of the throttle position values TH and for each of the types of gear shift operation (for example, 1-2 upshift and 2-3 upshift operations), and it comes close to 1 as the throttle position TH increases and it comes closer to 1 for the 2-3 upshift operation than for the 1-2 upshift operation.

If the psuedo speed ratio $\epsilon$ is equal to or greater than the predetermined value $\epsilon A$ as the result of the comparison between the pseudo speed ratio $\epsilon$ and the predetermined pseudo speed ratio value $\epsilon A$ made at the step 26, then it means that the gear shift operation is terminated and the program proceeds to the step 27 where the gear shift time measuring timer is stopped to terminate the measurement of the time period of the gear shift operation. The reason for this is as follows: After the gear shift operation is decided, the pseudo speed ratio $\epsilon$ decreases temporarily because of the change of the gear ratio iA after the gear shift operation and then increases due to the fact that the engine speed NE decreases with respect to the transmission output speed NO as the engagement of the friction elements progresses. Eventually it increases to the predetermined value $\epsilon A$ when the engagement of the friction elements is completed. Therefore, time T3 can be decided as the time at which the gear shift operation is completed. When, during the gear shift operation, the degree of change of the vehicle speed or the degree of change of the transmission output speed NO changes in such a fashion as indicated by the phantom line of FIG. 3, the degree of change of the engine speed NE changes as indicated by the phantom line of FIG. 3, whereas the pseudo speed ratio $\epsilon$ reaches the predetermined value $\epsilon A$ at time T3' when the engagement of the friction element is completed or the gear shift operation is terminated, as indicated by the phantom line. It is, therefore, apparent in this embodiment that the time at which the gear shift operation is actually completed can be detected with high accuracy, regardless of changes in the degree of change of the vehicle speed during the gear shift operation.

At the following step 28, based on a difference between the measured gear shift time and a target gear shift time determined to minimize shocks during the gear shift operation for each of the throttle position value TH, the line pressure correction factor is modified in such a manner to reduce the difference to zero. The correction factor is used during the execution of a separate line pressure correction routine to change the line pressure by the correction factor by changing the duty ratio of the drive signal applied to the line pressure solenoid 11. It is, therefore, possible in this embodiment to minimize shocks during a gear shift operation by controlling the line pressure in such a manner that the time required for the gear shift operation is controlled to a target value.

According to this embodiment, engine- and vehicle-speed sensors 4 and 5, which have been used for controlling the fuel-injection and spark timing of the engine 1, are used in the shock reduction apparatus. The initiation and termination of a gear shift operation or the fact that the automatic transmission is in the course of the gear shift operation can be detected with high accuracy without the use of any additional sensor. This results in an inexpensive and simple apparatus which can control the line pressure to reduce shocks to a sufficient extent during the gear shift operation.

Figure 3:
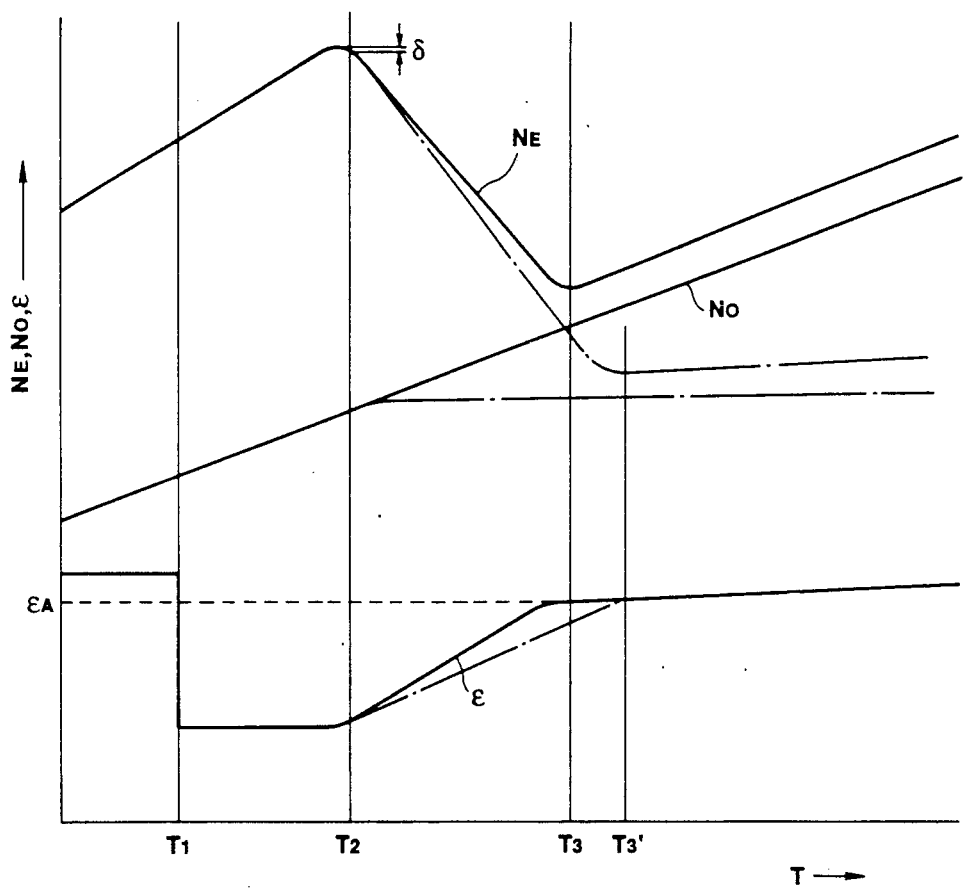
FIG. 3 is a time chart illustrating variations in the engine speed, transmission output speed and pseudo speed ratio during a gear shift operation.

FIG. 4 shows another application of the invention to a torque changing program where the output torque of the engine 1 is reduced (torque down) to reduce shocks during a gear shift operation in place of the line pressure control program employing learned data as described in connection with FIG. 3. Like reference numerals have been applied to FIG. 5 with respect to the equivalent steps shown in FIG. 3. In this embodiment, at the steps 30 and 31, a torque down signal Td (see FIG. 1) is produced, causing the engine control computer 3 to reduce the engine output torque so as to minimize shocks during the gear shift operation.

When the degree of change of the vehicle speed changes during the gear shift operation, the degree of change of the engine speed NE changes. However, the pseudo speed ratio $\epsilon = (NO \times iA)/NE$ reaches the predetermined value $\epsilon A$ when the engagement of the friction element is completed, regardless of changes in the degree of change of the engine speed NE, as described previously. At the step 26, the termination of the gear shift operation is detected when the pseudo speed ratio is equal to or greater than the predetermined value A. At the step 31, the engine output torque reduction is terminated. This is effective to prevent insufficient shock reduction due to a difference between the time at which the gear shift operation is actually terminated and the time at which the engine output torque reduction is turminated.

According to the second embodiment, the fact that the automatic transmission is in the course of a gear shift operation can be detected accurately without any additional speed sensor like the first embodiment. This results in an inexpensive and simple apparatus which can control the engine output torque to reduce shocks to a sufficient extent during the gear shift operation.

With the first embodiment of the apparatus, no additional speed sensor is required since the fact that the automatic transmision is in the course of a gear shift operation is detected based on pseudo speed ratio changes and the time period of the gear shift operation is measured to control the line pressure based on learned data during the gear shift operation. This results in an inexpensive and simple apparatus which can control the line pressure to reduce shocks to a sufficient extent during the gear shift operation.

With the second embodiment of the apparatus, no additional speed sensor is required since the fact that the automatic transmission is in the course of a gear shift operation is detected based on pseudo speed ratio changes and the prime motor output torque is modified. This results in an inexpensive and simple apparatus which can control the prime motor output torque to reduce shocks to a sufficient extent during the gear shift operation.

What is claimed is:

1. In a gear shift control apparatus for a power train including a prime motor, a torque converter, and an automatic transmission to which a prime motor output torque is transmitted through the torque converter, the automatic transmission being subjected to a gear shift operation from a gear position with a first gear ratio to another gear position with a second gear ratio the apparatus comprising:

prime motor output speed sensor means for detecting an output speed of the prime motor and for generating a prime motor output speed signal which is indicative of said prime motor output speed detected;

transmission output speed sensor means for detecting an output speed of the automatic transmission and for generating a transmission output speed signal which is indicative of said transmission output speed detected; and means for multiplying said automatic transmission output speed signal by the gear ratio of another gear position established after the gear shift operation to obtain a pseudo transmission input speed, for calculating a ratio of said pseudo transmission input speed to said prime motor output speed detected to obtain a torque converter pseudo speed ratio, for generating a torque converter pseudo speed ratio signal which is indicative of said torque converter pseudo speed ratio obtained, and for determining that the gear shift operation is completed when said torque converter pseudo speed ratio signal reaches a predetermined value.

2. In a gear shift control apparatus for a power train including a prime motor, a torque converter, and an automatic transmission to which a prime motor output torque is transmitted through the torque converter, the automatic transmission being subjected to a gear shift operation from a gear position with a first gear ratio to another gear position with a second gear ratio the apparatus comprising:

prime motor output speed sensor means for detecting an output speed of the prime motor and for generating a prime motor output speed signal which is indicative of said prime motor output speed detected;

transmission output speed sensor means for detecting an output speed of the automatic transmission and for generating a transmission output speed signal which is indicative of said transmission output speed detected;

means for multiplying said automatic transmission output speed signal by the gear ratio of another gear position established after the gear shift operation to obtain a pseudo transmission input speed, for calculating a ratio of said pseudo transmission input speed to said prime motor output speed detected to obtain a torque converter pseudo speed ratio, for generating a torque converter pseudo speed ratio signal which is indicative of said torque converter pseudo speed ratio, for initiating measurement of a time when said prime motor output speed signal starts decreasing and terminating measurement of said time when said torque converter pseudo speed ratio signal reaches a predetermined value, and for modifying a line pressure correction factor in response to said time.

3. In a gear shift control apparatus for a power train including a prime motor, a torque converter, and an automatic transmission to which a prime motor output torque is transmitted through the torque converter, the automatic transmission being subjected to a gear shift operation from a gear position with a first gear ratio to another gear position with a second gear ratio the apparatus comprising:

prime motor output speed sensor means for detecting the output speed of the prime motor and for generating a prime motor output speed signal which is indicative of said prime motor output speed detected;

transmission output speed sensor means for detecting an output speed of the automatic transmission and for generating a transmission output speed signal which is indicative of said transmission output speed detected;

means for multiplying said automatic transmission output speed signal by the gear ratio of another gear position established after the gear shift operation to obtain a pseudo input transmission speed, for calculating a ratio of said pseudo input transmission speed to said prime motor output speed detected to obtain a torque converter pseudo speed ratio, for generating a torque converter pseudo speed ratio signal which is indicative of said torque converter pseudo speed ratio, for initiating a torque down control of the prime motor when said prime motor output speed starts decreasing, and for terminating said torque down control when said pseudo speed ratio indicative signal reaches a predetermined value.

4. In a power train including a prime motor, a torque converter, and an automatic transmission to which a prime motor output torque is transmitted through the torque converter, the automatic transmission being subjected to a gear shift operation from a gear position with a first gear ratio to another gear position with a second gear ratio, a method of determining completion of the gear shift operation, comprising the steps of:

detecting an output speed of the prime motor and generating a prime motor output speed signal which is indicative of said prime motor output speed detected;

detecting the output speed of the automatic transmission and generating a transmission output speed signal which is indicative of said transmission output speed detected;

multiplying said automatic transmission output speed signal by the gear ratio of another gear position after the gear shift operation to obtain a pseudo transmission input speed;

calculating a ratio of said pseudo transmission input speed to said prime motor output speed detected to obtain a torque converter pseudo speed ratio and generating a torque converter pseudo speed ratio signal which is indicative of said torque converter pseudo speed ratio obtained;

comparing said torque converter pseudo speed ratio signal with a predetermined value; and determining that the gear shift operation is completed when the result of said comparing step indicates that said torque converter pseudo speed ratio signal reaches said predetermined value.

* * * * *